Patented June 13, 1950

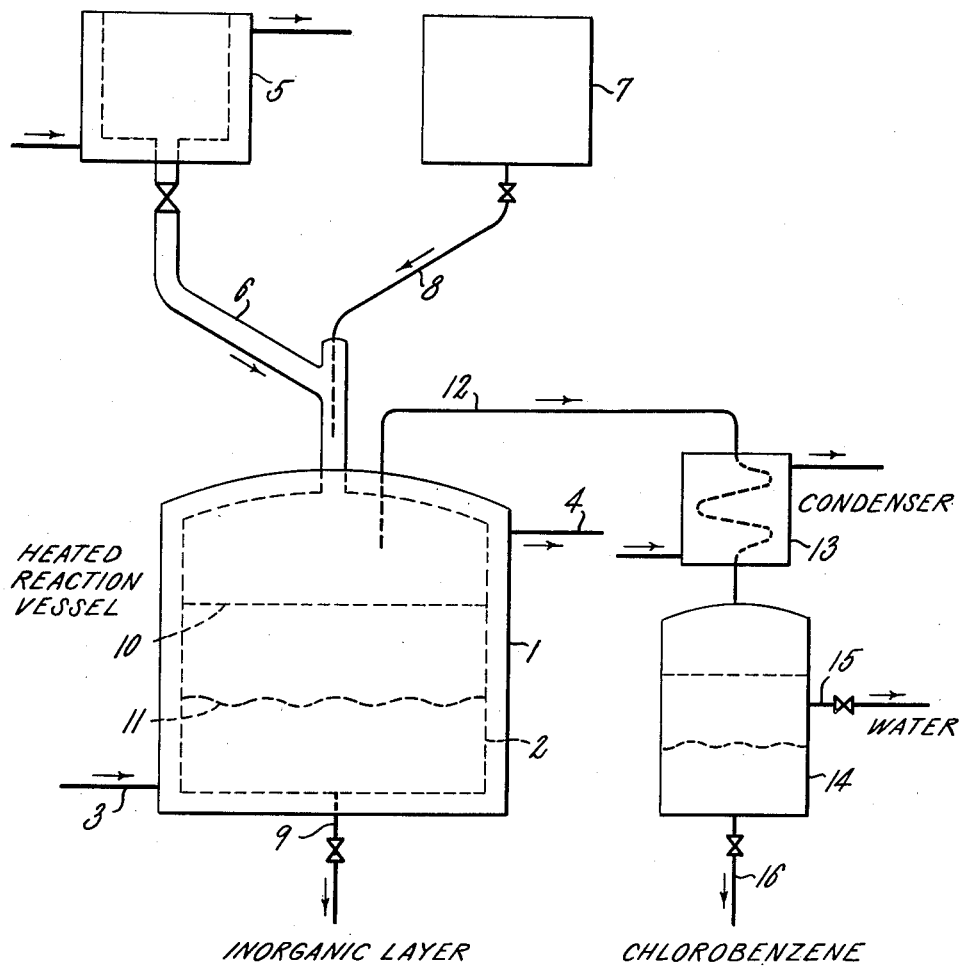

2,511,167

UNITED STATES PATENT OFFICE 2,511,167

RECOVERY OF CHLOROBENZENE

Richard H. F. Manske, Guelph, Ontario, Canada, Elwood B. Trickey, Easton, Pa., and Gordon S. Myers, Guelph, Ontario, Canada, assignors to United States Rubber Company, New York, N. Y., a corporation of New Jersey Application September 30, 1947, Serial No. 777,104
In Canada June 12, 1947

7 Claims. (Cl. 260—650)

This invention relates to a continuous process of recovering chlorobenzene (by which term herein is meant monochlorbenzene) from an alkali metal salt of p-chlorobenzenesulfonic acid.

During the process of manufacturing DDT (2,2-bis(p-chlorophenyl)-1,1,1-trichloroethane) from chlorobenzene and chloral in the presence of concentrated sulfuric acid, large amounts of chlorobenzene are lost by conversion to p-chlorobenzenesulfonic acid instead of to DDT. This loss of chlorobenzene substantially increases the cost of manufacturing DDT. Moreover the p-chlorobenzenesulfonic acid formed in the DDT process presents a major problem in waste disposal which necessitates special treatment of the wastes from the DDT process and thereby further increases the manufacturing cost of DDT.

In our co-pending application, Serial No. 777,103 filed of even date herewith, we have disclosed a continuous process of recovering chlorobenzene from p-chlorobenzenesulfonic acid by the hydrolysis thereof with sulfuric acid as the hydrolysis catalyst, an alkali metal compound being added to the reaction zone to form a separate inorganic layer below the organic layer, this inorganic layer containing alkali metal acid sulfate formed by reaction of the added alkali metal compound with the sulfuric acid liberated by the hydrolysis and being withdrawn at a rate corresponding to its rate of formation. The chlorobenzene liberated by the hydrolysis is continuously distilled from the hydrolysis mixture which is kept boiling at a temperature below 240° C. and usually at at least 220° C.

Frequently the p-chlorobenzenesulfonic acid is neutralized with alkali to convert it to the sodium or potassium salt. This neutralization is especially desirable in the case of p-chlorobenzenesulfonic acid formed as a by-product of DDT manufacture since such by-product p-chlorobenzenesulfonic acid contains a substantial amount of sulfuric acid and storage thereof is a problem. Neutralization with alkali converts both the sulfuric acid and the sulfonic acid to the alkali metal salts and the resulting mixture can be readily stored. It would be distinctly advantageous to be able to convert economically the alkali metal salt of p-chlorobenzenesulfonic acid formed incidental to the DDT process as described above to chlorobenzene for re-use in the making of DDT. We have invented a process which will accomplish this purpose. The principal aim and object of the present invention is to provide a commercially feasible process of converting the alkali metal salt of p-chlorobenzenesulfonic acid, especially that contained in the mixture formed upon neutralization of the p-chlorobenzenesulfonic acid obtained as a by-product of the DDT process to chlorobenzene, and recovering the chlorobenzene for reuse in the DDT process.

Our invention is a continuous process of effecting the conversion of an alkali metal salt of p-chlorobenzenesulfonic acid to chlorobenzene. Our process comprises continuously boiling a mixture comprising a major proportion of an alkali metal salt of p-chlorobenzenesulfonic acid, a minor proportion of sulfuric acid and a minor proportion of water at a temperature above 200° C., continuously removing vapors of water and chlorobenzene distilling from the boiling mixture, continuously condensing said vapors to recover the chlorobenzene, adding to the mixture undergoing boiling an alkali metal salt of p-chlorobenzenesulfonic acid, adding to the mixture during boiling sulfuric acid, adding to the mixture during boiling water in amount sufficient to maintain the boiling point of the mixture at below 240° C., the amount of said sulfuric acid added being such that an aqueous inorganic layer forms below the mixture, this inorganic layer comprising alkali metal acid sulfate, sulfuric acid and water, and withdrawing the aqueous inorganic layer so formed at a rate substantially corresponding to that at which it is formed.

Our invention is based on the discovery that the alkali metal salt of p-chlorobenzenesulfonic acid may be readily converted to chlorobenzene in excellent yield by the simple expedient of adding sulfuric acid to the boiling mixture undergoing hydrolysis in such amount that a separate inorganic layer is formed below the organic mixture in which the reaction is taking place. The sulfuric acid serves to bring about the formation of this inorganic layer which removes from the reaction zone the alkali metal acid sulfate formed by the hydrolysis which is in accordance with the following equation:

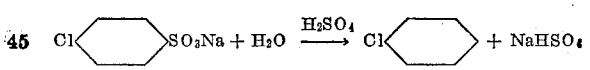

If alkali metal sulfate is present in admixture with the alkali metal salt of p-chlorobenzenesulfonic acid being treated, as is very frequently the case, the sulfuric acid added serves to convert this free alkali metal sulfate to the acid sulfate, which is removed in the inorganic layer.

Vapors of water and chlorobenzene which are taken overhead from the hydrolysis zone separate upon condensation into two liquid phases, namely an upper water phase and a lower chlorobenzene phase. These two phases are separately withdrawn from the condensate accumulator. The chlorobenzene phase is in a form suitable, after drying, for recycling directly to the DDT process. The water phase may conveniently be recycled to the hydrolysis and distilling unit employed in carrying out the present invention, where it serves as the water required to effect the hydrolysis as well as the water required to effect, with the sulfuric acid and the alkali metal acid sulfate, formation of the separate inorganic layer which is essential to operation of the present invention.

Our invention is a commercially feasible continuous process for the conversion of the alkali metal salt of p-chlorobenzenesulfonic acid to chlorobenzene at a very fast rate in yields which are 90% or better of the theoretical. The success of our process is due to (1) our discovery that the addition of a small amount of sulfuric acid, and of course water if it is not already present, to a large amount of the alkali metal salt of p-chlorobenzenesulfonic acid produces a mixture which hydrolyzes at a rapid rate to chlorobenzene, and (2) our discovery of a unique continuous method of removing the alkali metal acid sulfate formed as a product of the hydrolysis.

The use of a small amount of sulfuric acid in accordance with the present invention avoids the formation of the tarry products which are obtained when strong sulfuric acid is employed.

The fact that the hydrolysis mixture comprises the alkali metal salt of p-chlorobenzenesulfonic acid as the major component with only a small amount of sulfuric acid and only a small amount of water, which small amounts are necessary to start the hydrolysis, allows a small reactor to handle a very large amount of the alkali metal salt of the sulfonic acid in a given period of time. It will be seen from the above equation for the hydrolysis reaction that 120 parts of sodium acid sulfate are formed from every 215 parts of sodium p-chlorobenzenesulfonate that are hydrolyzed. Unless this sodium acid sulfate were removed, it would accumulate in the reactor and prevent the hydrolysis from being carried out by a continuous process without the necessity of discharging the contents of the reactor very frequently. Moreover in a batch process where the alkali metal acid sulfate is allowed to accumulate, the proportion of alkali metal acid sulfate to alkali metal salt of p-chlorobenzenesulfonic acid increases steadily during the hydrolysis so that the rate of chlorobenzene formation falls off continuously to a small value.

We have found that a satisfactory continuous process is obtained if enough of the sulfuric acid is added to give a bottom inorganic layer which varies in composition from 52% sodium acid sulfate, 37% sulfuric acid and 11% water to a mixture containing NaHSO4 and just enough H2SO4 and H2O to obtain a liquid layer at the temperature of hydrolysis. Of the three components named, the sodium acid sulfate is present in greatest amount, sulfuric acid being next, and water being least in amount. It will be understood that other materials and by-products may also be present in the inorganic layer although they are usually in small amounts.

The amount of water in the bottom inorganic layer is dependent on the amount of water added to the reaction vessel and the amount of water added to the reaction vessel is only enough to maintain the boiling point above 200° C. and below 240° C. and preferably at at least 220° C.

In the preferred practice of the present invention, the operation is so conducted that the inorganic layer contains from 68 to 72 parts of sodium acid sulfate, from 23 to 27 parts of sulfuric acid and from 4 to 6 parts of water, the total of these three being 100 parts. All percentages and parts referred to herein are by weight.

The optimum composition of the inorganic layer is 70 parts of sodium acid sulfate, 25 parts of sulfuric acid and 5 parts of water.

We have found that, where the sodium salt of p-chlorobenzenesulfonic acid is used, the addition of from 18–22 parts of sulfuric acid per 100 parts of the sodium salt of the p-chlorobenzenesulfonic acid together with from 128 to 132 parts of sulfuric acid per 100 parts of any sodium sulfate that may be present in admixture with the salt of p-chlorobenzenesulfonic acid, enables an inorganic layer having the foregoing preferred composition to be readily obtained.

The sulfuric acid must be employed in amount sufficient to give two layers which separate. If too great an amount is employed there is no separation of layers in the reaction mixture. If too little an amount of H2SO4 is employed solid sodium acid sulfate separates and forms a slurry. It is then difficult to obtain the formation of the two layers necessary for the practice of the present invention.

In general the process of the present invention involves charging a reactor constructed of glass or of suitable corrosion-resistant materials with the alkali metal salt of p-chlorobenzenesulfonic acid, and an amount of sulfuric acid and water such that the boiling point is raised to give a mixture boiling at a temperature above 200 and less than 240° C. and preferably at least 220° C. and less than 240° C. and which will separate into two layers. Water and chlorobenzene distill from the boiling mixture. Alkali metal salt of p-chlorobenzenesulfonic acid is added to this reaction mixture either simultaneously and continuously or intermittently with enough sulfuric acid to give the separate inorganic layer. Only enough water is introduced to the reactor, either from the distillate or from an extraneous source, so that the boiling point of the contents is maintained at between 200° C. and 240° C. and preferably at least 220° and less than 240° C. A temperature of 230° C. is often optimum. The inorganic layer settles to the bottom of the vessel and is withdrawn at a rate corresponding to that at which it is formed. Such a process gives a maximum rate of hydrolysis to chlorobenzene and is economically attractive. Tar formation is reduced to a minimum.

In a continuous operation it is preferred to carry out all of the steps of the process continuously. The boiling or distillation step and the removal of the liberated vapors of water and chlorobenzene are always carried out continuously. The withdrawal of the aqueous inorganic layer may be carried out intermittently but in ordinary practice it is carried out continuously. In any event the withdrawal of the inorganic layer is at a rate corresponding substantially to the rate at which it is formed. The additions of alkali metal salt of p-chlorobenzenesulfonic acid, of water and of sulfuric acid may be carried out intermittently if desired but are preferably carried out continuously.

The process is most conveniently conducted at atmospheric pressure. However, pressures ranging from slightly below atmospheric to moderate super atmospheric may be employed. Use of sub-atmospheric pressure is usually impractical because of the necessity of providing means for reducing the pressure. Use of pressures moderately above atmospheric, for example up to 50 pounds per square inch gage are more practical although increasing the expense of equipment. The preferred range of at least 220 but less than 240° C. for boiling of the mixture undergoing hydrolysis applies to operation at substantial atmospheric pressures, say at pressures ranging from minus 5 to plus 20 pounds per square inch gage.

Addition of water to the hydrolysis mixture in amounts sufficient to hold the boiling point at the level mentioned above insures the presence of enough water to effect the hydrolysis reaction, and in addition some excess water which goes into the inorganic layer and which may in part, depending on the amount of excess, be vaporized along with the chlorobenzene.

Referring to the accompanying drawing, there is provided a reaction vessel 2 in which the hydrolysis is conducted. Vessel 2 is equipped with any suitable means such as jacket 1 for heating the same and maintaining the contents at the boiling temperature. Jacket 1 may be heated by a heating medium entering via line 3 and leaving via line 4. A supply of alkali metal salt of p-chlorobenzenesulfonic acid is maintained in vessel 5 and is added by valved line 6. Sulfuric acid for accomplishing the results described herein is added from vessel 7 via valved line 8. The aqueous inorganic layer collecting in the bottom of the reactor 2 is withdrawn via valved line 9. The level of the boiling liquid is indicated by reference numeral 10 and the interface between the lower inorganic layer and the upper organic layer is indicated by reference numeral 11.

The vapors of water and chlorobenzene are withdrawn via line 12 from the vapor space in reactor 1 and are condensed in condenser 13. The condensate is collected in accumulator 14 where layer formation takes place. The upper layer of water is withdrawn via line 15 while the chlorobenzene product layer is withdrawn via line 16.

From the foregoing description it will be seen that the present invention provides a simple and economical continuous method of recovering chlorobenzene from an alkali metal salt of p-chlorobenzenesulfonic acid. Among the many advantages of the process are its simplicity and cheapness, its adaptability to crude alkali metal salt of p-chlorobenzenesulfonic acid, the high rate of hydrolysis and the fact that a minimum of undesirable reactions, particularly tar formation take place. Another advantage is that the apparatus requirements for the carrying out of the process are simple. Another advantage is that the DDT waste disposal problem is greatly simplified since the inorganic layer withdrawn is much more easily disposed of than the alkali metal salt of p-chlorobenzenesulfonic acid. Another advantage is that the two products of the hydrolysis reaction, namely chlorobenzene and alkali metal acid sulfate are very rapidly removed from the zone of reaction, namely the upper organic layer, the chlorobenzenene being removed in the vapor state in admixture with vaporized water and the alkali metal acid sulfate being removed by passage into the lower inorganic layer which is removed continuously or intermittently as necessary or desirable. Many other advantages of the present invention will be apparent to those skilled in the art.

As used herein the terms "major proportion" and "minor proportion" denote a proportion exceeding 50% of the mixture and a proportion which is less than 50% of the mixture respectively. Thus by the expression "a major proportion of an alkali metal salt of p-chlorobenzenesulfonic acid, a minor proportion of sulfuric acid and a minor proportion of water" is meant that the alkali metal salt is present in amount exceeding 50 weight per cent of the sum of these three components while sulfuric acid and water are each present in amount less than 50%, usually substantially less. In such a mixture the sulfuric acid is usually present in amount greater than the water. It is sufficient if the amount of water present with the alkali metal salt of the p-chlorobenzenesulfonic acid is sufficient to combine with this alkali metal salt and also to furnish a small amount of water for the inorganic layer and if the amount of sulfuric acid is sufficient to catalyze the hydrolysis and bring about the formation of the separate inorganic layer as explained above.

Having thus described our invention, what we claim and desire to protect by Letters Patent is:

1. A continuous process of effecting the conversion of an alkali metal salt of p-chlorobenzenesulfonic acid to chlorobenzene which comprises continuously boiling an organic mixture comprising a major proportion of an alkali metal salt of p-chlorobenzenesulfonic acid, a minor proportion of sulfuric acid and a minor proportion of water at a temperature above 200° C. and below 240° C., continuously removing vapors of water and chlorobenzene distilling from the boiling mixture, continuously condensing said vapors to recover the chlorobenzene, adding to said mixture during said boiling an alkali metal salt of p-chlorobenzenesulfonic acid, adding to said mixture during said boiling sulfuric acid, adding to said mixture during said boiling water in amount sufficient to maintain the boiling point of the mixture at above 200° C. and below 240° C., the amount of said sulfuric acid added being such that an aqueous inorganic liquid layer forms below said mixture, said inorganic liquid layer comprising alkali metal acid sulfate, sulfuric acid and water and ranging in composition from alkali metal acid sulfate containing only enough sulfuric acid and only enough water to give a liquid layer at the temperature of hydrolysis to a composition of 52% alkali metal acid sulfate, 37% sulfuric acid and 11% water, said percentages being by weight, allowing said layer to form continuously below said mixture, and withdrawing the aqueous inorganic liquid layer so formed at a rate corresponding substantially to that at which it is formed.

2. A continuous process of effecting the conversion of an alkali metal salt of p-chlorobenzenesulfonic acid to chlorobenzene which comprises continuously boiling an organic mixture comprising a major proportion of an alkali metal salt of p-chlorobenzenesulfonic acid, a minor proportion of sulfuric acid and a minor proportion of water at a temperature of at least 220° C. but below 240° C., continuously removing vapors of water and chlorobenzene distilling from the boiling mixture, continuously condensing said vapors to recover the chlorobenzene, adding to said mixture during said boiling an alkali metal salt of p-chlorobenzenesulfonic acid, adding to said mixture during said boiling sulfuric acid, adding to said mixture during said boiling water in amount sufficient to maintain the boiling point of the mixture at at least 220° C., but less than 240° C., the amount of said sulfuric acid added being such that an aqueous inorganic liquid layer forms below said mixture, said inorganic liquid layer comprising alkali metal acid sulfate, sulfuric acid and water and ranging in composition from alkali metal acid sulfate containing only enough sulfuric acid and only enough water to give a liquid layer at the temperature of hydrolysis to a composition of 52% alkali metal acid sulfate, 37% sulfuric acid and 11% water, said percentages being by weight, allowing said layer to form continuously below said mixture, and withdrawing the aqueous inorganic liquid layer so formed at a rate corresponding substantially to that at which it is formed.

3. The process of claim 2 wherein said alkali metal salt is the sodium salt.

4. The process of claim 2 wherein said alkali metal salt is the sodium salt and wherein the amount of said sulfuric acid added to the mixture is such that said aqueous inorganic layer comprises sodium acid sulfate, sulfuric acid and water in proportions by weight of from 68 to 72% sodium acid sulfate, from 23 to 27% sulfuric acid and from 4 to 6% of water, said percentages totalling 100%.

5. The process of claim 2 wherein said alkali metal salt is the sodium salt and wherein the amount of said sulfuric acid added to the mixture is such that said aqueous inorganic layer comprises sodium acid sulfate, sulfuric acid and water in the proportions by weight of approximately 70% sodium acid sulfate, 25% sulfuric acid and 5% water.

6. The process of claim 2 wherein said alkali metal salt of p-chlorobenzenesulfonic acid is a crude mixture of the alkali metal salt of p-chlorobenzenesulfonic acid and alkali metal sulfate resulting from the neutralization with alkali of crude p-chlorobenzenesulfonic acid containing sulfuric acid formed as a by-product in the manufacture of 2,2-bis(p-chlorophenyl)-1,1,1-trichloroethane by condensation of chlorobenzene with chloral with concentrated sulfuric acid as a condensing agent.

7. The process of claim 2 wherein said alkali metal salt of p-chlorobenzenesulfonic acid is in the form of a mixture of the sodium salt of p-chlorobenzenesulfonic acid and sodium sulfate and wherein from 18 to 22 parts of sulfuric acid per 100 parts of sodium salt of p-chlorobenzenesulfonic acid and from 128 to 132 parts of sulfuric acid per 100 parts of sodium sulfate present are added to the mixture.

RICHARD H. F. MANSKE.
ELWOOD B. TRICKEY.
GORDON S. MYERS.

REFERENCES CITED

The following references are of record in the file of this patent:

UNITED STATES PATENTS

| Number | Name | Date |
|---|---|---|
| 1,796,108 | Kalischer et al. | Mar. 10, 1931 |
| 1,822,982 | Rosch et al. | Sept. 15, 1931 |

OTHER REFERENCES

"Chemical Abstracts," vol. 32, col. 1549 (1938). Abstract of article by Vesely.